(12) United States Patent
Patel et al.

(10) Patent No.: US 7,111,883 B1
(45) Date of Patent: Sep. 26, 2006

(54) PIVOTABLE AND INTERCHANGEABLE CONSOLE

(75) Inventors: Udit Patel, Belleville, MI (US); Sunil Palakodati, Novi, MI (US); Mohan R. Paruchuri, Canton, MI (US); Balaji Bharadwaj, Inkster, MI (US); Abha Tiwari, Sterling Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/352,155

(22) Filed: Feb. 10, 2006

(51) Int. Cl.
*B60R 7/04* (2006.01)

(52) U.S. Cl. .................... 296/24.34; 296/37.8

(58) Field of Classification Search ............. 296/24.34, 296/37.1, 37.8, 37.12; 224/275, 483, 282, 224/484, 538
See application file for complete search history.

(56) References Cited

U.S. PATENT DOCUMENTS

| 4,568,117 | A | 2/1986 | McElfish et al. |
| 5,085,481 | A | 2/1992 | Fluharty et al. |
| 5,102,181 | A | 4/1992 | Pinkney |
| 5,106,143 | A | 4/1992 | Soeters |
| 5,338,081 | A | 8/1994 | Young et al. |
| 5,609,382 | A | 3/1997 | Schmid et al. |
| 5,823,599 | A | 10/1998 | Gray |
| 6,086,129 | A * | 7/2000 | Gray ......................... 296/37.8 |
| 6,394,526 | B1 * | 5/2002 | Gyllenspetz ............. 296/37.12 |
| 6,435,587 | B1 | 8/2002 | Flowerday et al. |
| 6,789,831 | B1 * | 9/2004 | Schmidt et al. .......... 296/37.12 |
| 7,029,048 | B1 * | 4/2006 | Hicks et al. ............. 296/24.34 |
| 2005/0082860 | A1 | 4/2005 | Kubota |
| 2005/0082861 | A1 * | 4/2005 | Kubota et al. ........... 296/24.34 |

* cited by examiner

*Primary Examiner*—Jason Morrow
(74) *Attorney, Agent, or Firm*—Brinks Hofer Gilson & Lione

(57) ABSTRACT

A center console for a motor vehicle comprising a stationary housing mounted within the vehicle. The housing includes an open center defined between opposing ends and has a console body mounted within the open center of the housing. The console body is rotatable about a longitudinal axis running through the console body and is mounted such that an operator may remove the body from the frame. Also, at least two longitudinal side walls of the rotating body are visible within the open center and the console body may be rotated such that alternate side walls may be positioned in an uppermost position with respect to the center console. Thus, a user may exchange the console body for another and access multiple sides of the console body, regardless of which is in the uppermost position.

11 Claims, 5 Drawing Sheets

PIVOTABLE AND INTERCHANGEABLE CONSOLE

BACKGROUND

1. Field of the Invention

The present invention generally relates to automotive interior subsystems. More specifically, the invention relates to a reconfigurable, interchangeable, rotating center console for a motor vehicle.

2. Description of Related Art

Operators and passengers of motor vehicles may spend many hours within a vehicle interior. As a result, significant effort is expended by manufacturers to ensure the interiors of their vehicles provide a comfortable, functional, space from which to operate the vehicle. This requires well positioned controls and comfortable seats. However, another important feature is storage and organization.

This is particularly important for people who do business or travel the country in their vehicle. These individuals may have extensive storage needs. In filling this need, manufacturers have provided closable boxes, of which the traditional glove box is a classic example.

Over the years the storage needs of users of motor vehicles has grown. Today, users expect to store cellular phones, drinks, notebook computers, compact discs, portable music players, wallets and purses securely and within easy reach. This has resulted in expanded storage requirements for modern vehicles. For example, manufactures now include cup-holders, door mounted storage compartments, large glove boxes and center console bins. In addition, as storage requirements have changed, so to have the bins and compartments designed to meet those requirements.

An example of this is the removable bins disclosed in U.S. Pat. No. 5,085,481 ("Fluharty"). Fluharty discloses a center console frame work with multiple windows for receiving various storage bins to allow a user to rearrange the storage configuration. This allows users to customize their console configuration for each individual trip. However, this arrangement does not necessarily make the most efficient use of space within the console. This is because the bins are stationary when in use and they must be oriented so the opening is always up, lest items fall out of the bin.

An alternative arrangement that allows the opening of the bin to be oriented in multiple directions involves a module that rotates about a longitudinal axis. A typical example is illustrated in U.S. Pat. No. 5,823,599 ("Gray"). Gray discloses a center console that includes a drum-type carrousel that rotates about a generally horizontal axis. This allows a user to access multiple storage bins attached to the carrousel by rotating the carrousel about the axis and causing a bin to rotate into an access window. The remaining bins are enclosed within the console, thus preventing items from falling out while also providing access. However, only a single bin of the carrousel may be accessed at any one time.

In view of the above, it is apparent that there exists a need for an improved center console that provides enhanced utility customizability.

SUMMARY

In satisfying the above need, as well as overcoming the enumerated drawbacks and other limitations of the related art, the present invention provides a center console for a motor vehicle comprising a stationary housing mounted within the vehicle. The housing includes an open center defined between opposing ends and has a console body mounted within the open center of the housing. The body is rotatable about a longitudinal axis running through the console body and is mounted such that an operator may remove the body from the frame and substitute a different console body. Finally, at least two longitudinal side walls of the rotating body are visible within the open center and the body may be rotated such that alternate side walls may be positioned in an uppermost position with respect to the center console.

This configuration allows a user to exchange one console body for another and to access multiple sides of the console body when traveling, regardless of which side is in the uppermost position.

Further objects, features and advantages of this invention will become readily apparent to persons skilled in the art after a review of the following description, with reference to the drawings and claims that are appended to and form a part of this specification.

DETAILED DESCRIPTION

Figure 1:
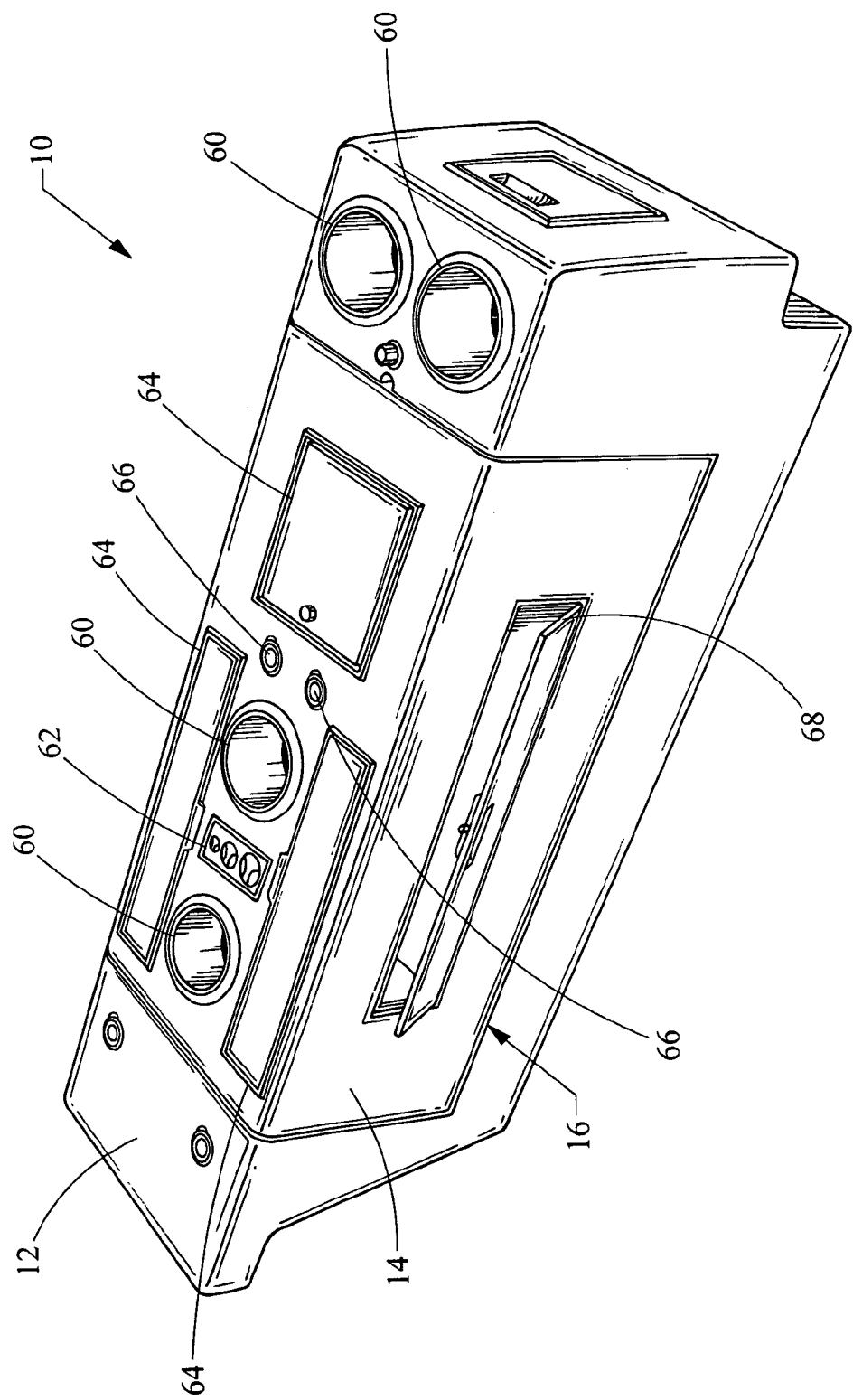
FIG. 1 is an isometric view of the center console showing the console body mounted within the housing.
Figure 2:
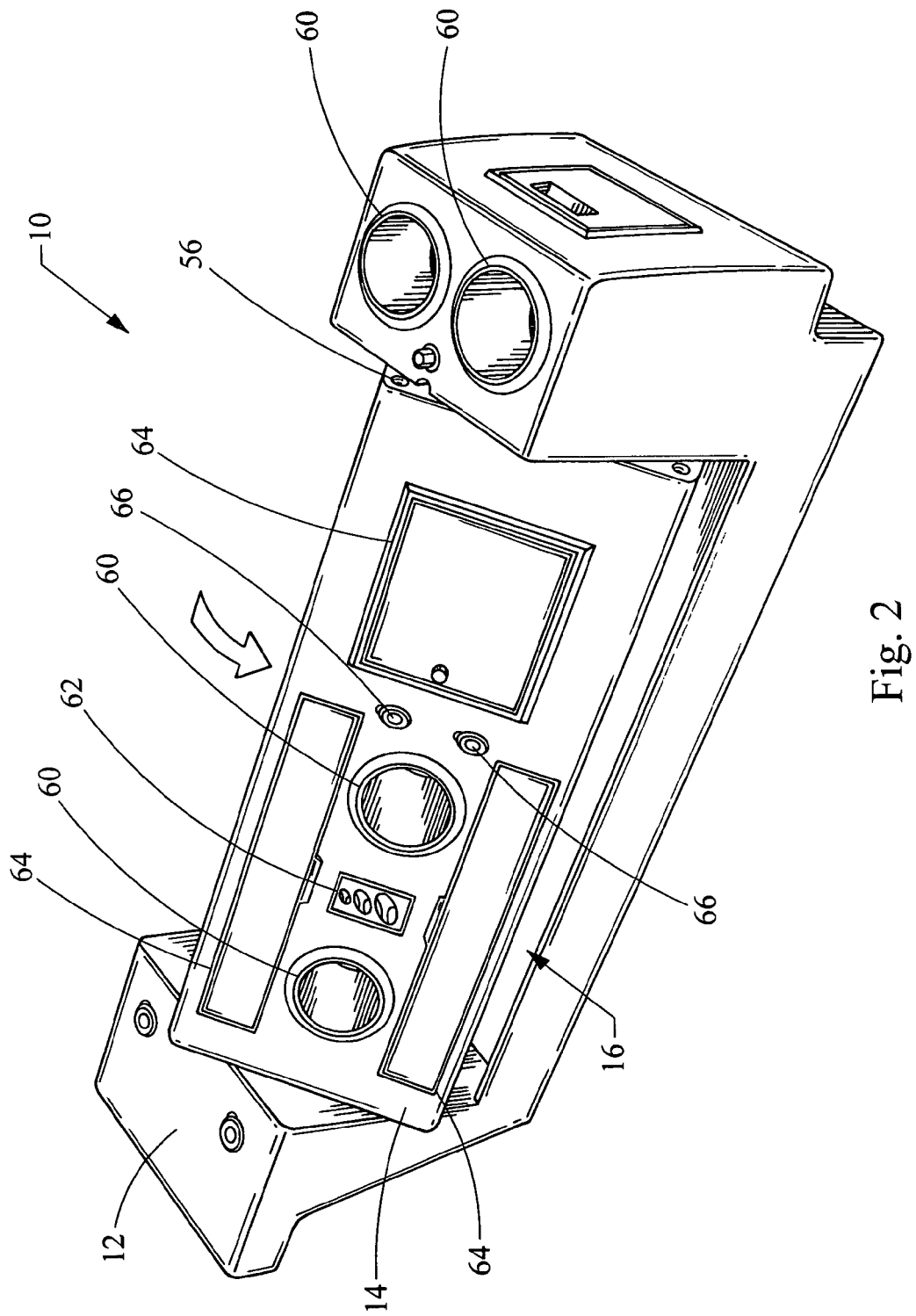
FIG. 2 is an isometric view of the center console showing the console body rotated within the housing.

Referring now to the drawings, an automotive console embodying the principles of the present invention for use in a motor vehicle is illustrated in FIG. 1 and designated at 10. As its primary components, the console 10 includes a housing 12 and a console body 14. As shown in FIG. 2, the console body 14 is received within the housing 12 in such a way that the console body 14 is generally restrained in a given orientation, or detent position, but may rotate to another orientation upon the command of a user as illustrated in FIG. 2. In some embodiments it may be advantageous to allow the console body 14 to rotate freely without restriction. In either case each side can be sequentially rotated into an accessible position. Rotation is achieved either manually, by direct user manipulation, or through the use of known motors and controls. While the motors would preferably be electrical, they may be hydraulic, pneumatic or the like.

Figure 3:
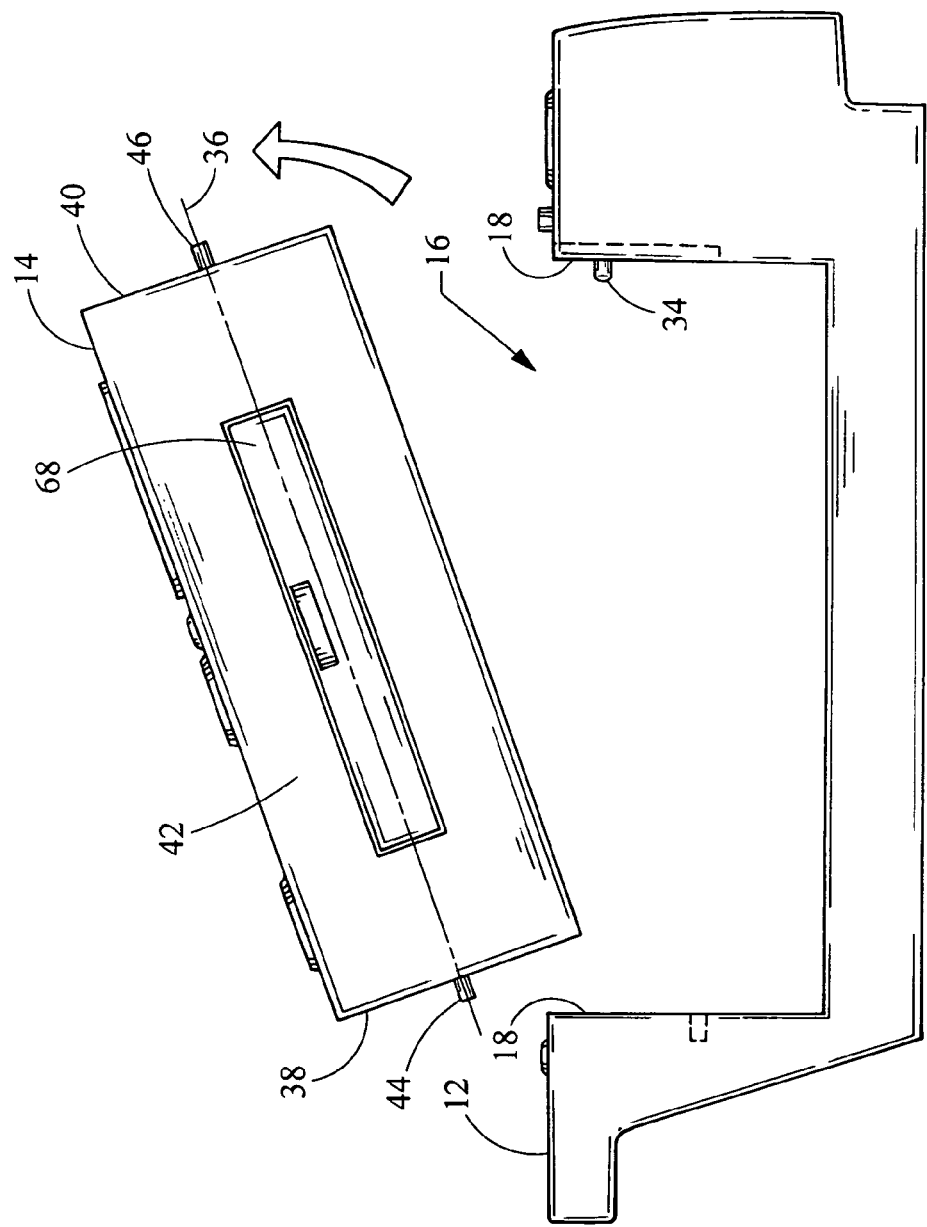
FIG. 3 is a side view of the center console showing the housing and the console body, with the console body removed from the housing.

In addition, as shown in FIG. 3, the console body 14 is removable from between opposing ends 18 of an open center 16 of the housing 12. This allows for the provision of rotating bodies 14 having different configurations; for example, his and hers units may be substituted depending on who is using the vehicle.

Figure 4:
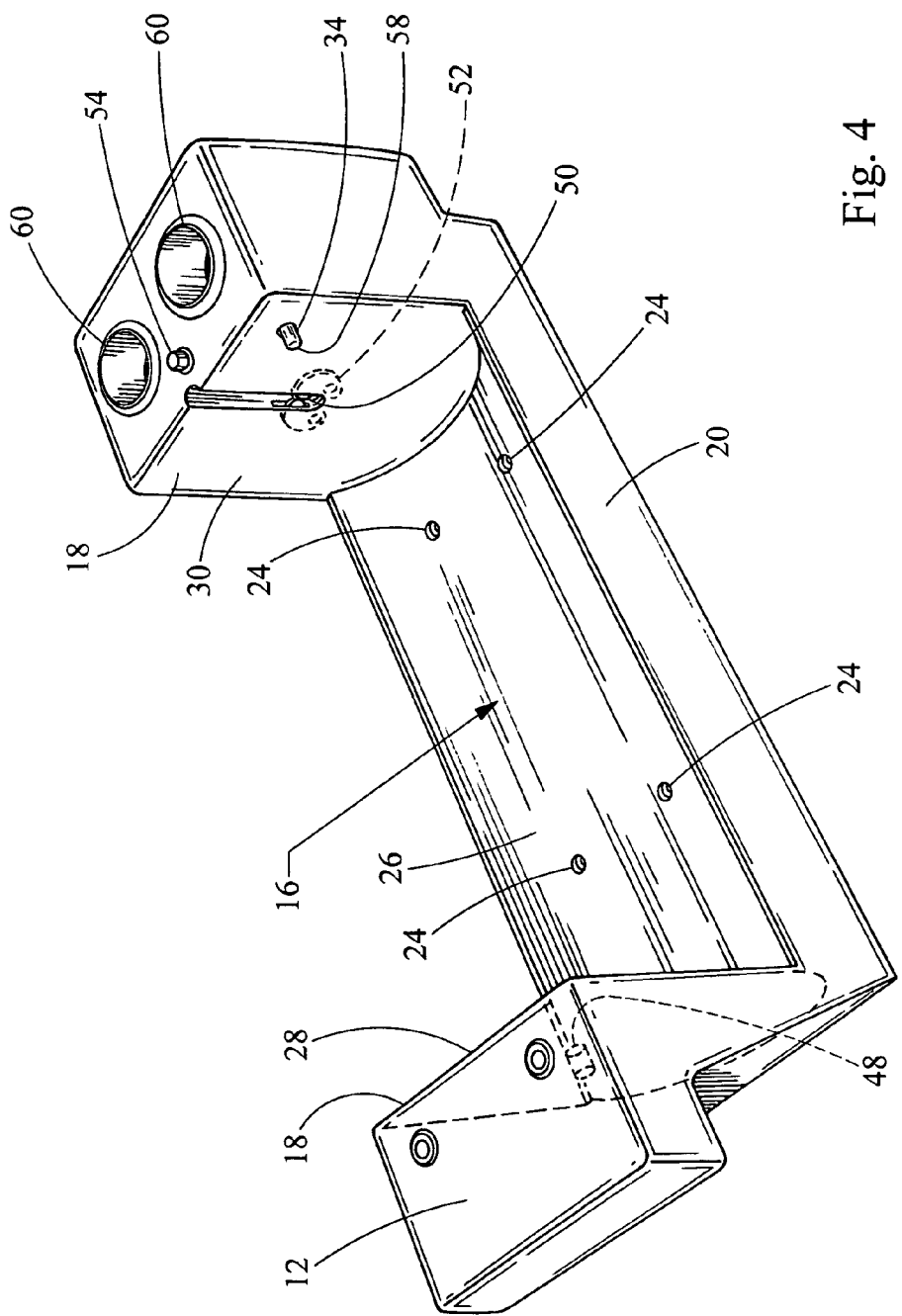
FIG. 4 is a perspective view of the housing showing the interface between the housing and the console body.

Looking more closely at the housing 12, in FIG. 4 it consists of a frame 20 mounted in a stationary manner, using conventional means, within a cabin of the vehicle (not shown). Usually, this involves inserting bolts, rivets, or screws (not shown) through holes 24 in the frame 20 and into a structural feature (not shown) at the floor of the vehicle cabin. Alternatively, clips, brackets or even welding may be used.

In addition, the frame 20 also includes a base 26 in between a first receiving portion 28 opposing a second receiving portion 30. Together, the receiving portions 28 and 30 form the opposing ends 18. At least one of the receiving portions 28 and 30 has a latch 50 and the other a hole 48. In addition, at least one of the receiving portions 28 and 30 includes a detent mechanism 34.

Looking at the console body 14, it may take any shape needed by the mechanics and aesthetics of the application. Typical shapes are a cylinder, cube, triangular prism, or rectangular prism. The embodiment shown in the drawings is that of a rectangular prism.

Turning to FIG. 3, the console body 14 has a front wall 38 opposing a rear wall 40 connected together by at least one side wall 42. A longitudinal axis 36 runs the length of the body 14, intersecting both the front wall 38 and the rear wall 40. Collinear with the longitudinal axis 36, a forward shaft 44 and rear shaft 46 are installed in the front wall 38 and the rear wall 40 such that each shaft extends along the longitudinal axis 36 outward from an interior volume of the of the console body 14. The shafts 44 may be attached to their respective walls, 38 and 40, by any conventional means, for example screws, nuts, rivets, flanges or pins.

When the rotating body 12 is installed within the open center 16 of the housing 12, the shafts 44 and 46 are received by the first and second receiving portions 28 and 30 respectively. In the embodiment shown, the hole 48 is approximately centered in the surface of the first receiving portion 28 and is designed to accept the forward shaft 44 in a rotating manner, while at the same time preventing horizontal, vertical or axial movement. However, any other mechanism that can receive a shaft and allow it to rotate while preventing horizontal, vertical or axial movement may also be used.

Generally opposite the hole 48 a latch 50 is provided approximately centered in the second receiving portion 30. Like the hole 48, the latch 50 is designed to accept the rear shaft 44 in a rotating manner and to prevent axial movement. However, unlike the hole 48, the latch 50 uses a movable retainer 52 to prevent horizontal or vertical movement. The retainer 52 is mechanically connected to an actuator 54 by a conventional connection. When the actuator 54 is triggered, it retracts the retainer 52, thereby freeing the rear shaft 46 for movement in the vertical direction. Other embodiments may free the shaft 46 for movement in the horizontal direction or both the horizontal and vertical directions. In any case, this allows the rear end of the console body 14 to be lifted from the second receiving portion 30, permitting the removal of the console body 14 from the housing 12.

The above is but one example of the present invention, with other combinations of these elements being possible. For example, the shafts 44 and 46 may be incorporated onto the receiving portion's 28 and 30, and the hole 48 and latch 50 would be included in the front and rear walls 38 and 40 of the console body 14.

Turning to the actuator 54, it may be any kind of mechanical or electromechanical actuator known in the art. One exemplary embodiment as shown in the FIG. 3, uses a simple mechanical push-button for the actuator 54. In this arrangement, a movable button is mechanically attached to the retainer 52. When the user pushes the button, the movement of the button is translated into movement of the retainer 52, which releases at least one of the shaft's 44 or 46. Another device may use a known mechanical lock and key arrangement. In this embodiment, the lock is attached to the retainer 52. When a user inserts and turns a key in the lock, the retainer 52 is retracted. Finally, the actuator 54 may also be electrical. Upon activating a control, an electrical motor or other device opens the retainer 52. It is important to note that these are just exemplary embodiments, and many additional mechanisms known in the art are capable of functioning as the actuator 54.

Alternatively, another example may place the latch 50 within the console body 14 and mechanically attached it to at least one of the shaft's 44 and 46. In this embodiment, both of the opposing ends 18 include a hole 48 for receiving their respective shafts 44 and 46. Upon triggering the actuator 54, the latch 50 would retract at least one of the shafts 44 and 46 into the interior volume of the console body 14, permitting its removal.

Looking at the detent mechanism 34 of the present embodiment, at least one of the front or rear walls 38, 40 include at least one detent receiver 56. It is oriented to align with the detent mechanism 34 in at least one orientation of the console body 14. The detent mechanism 34 includes a protrusion 58, mounted in a flexible manner such that the protrusion 58 extends beyond the outer surface of the second receiving portion 30 (see FIG. 4). Thus, when the console body 14 is installed, the protrusion 58 will deflect into the second receiving portion 30, but remain in contact with the rear wall 40. Therefore, when the detent receiver 56 is rotated into alignment with the protrusion 58, it will extend into the recess 56 and restrain the rotation of the console body 14. The number of detent recesses 56 determines the number of positions into which the console body 14 may be rotated. For example, two recesses 56 will result in the body 14 having two restrained positions.

In this case, the detent mechanism 34 has the form of a flexible tab or a spring biased ball. Upon the application of axial pressure, the tab or ball will move beneath the surface of the second receiving portion 30. When pressure is removed it returns to its original position.

This is but one example of the detent mechanism 34. In other embodiments, the detent mechanism 34 may be located in the console body 14, rather than the frame 20. In such an embodiment, the protrusion 58 may extend beyond at least one of the front or rear walls 38, 40. Consequently, at least one detent receiver 56 must be included opposite the detent mechanism 34 in the receiving portion 28, 30.

Further examples may include a cam installed on one of the shafts 44, 46 that engages a spring loaded arm, wherein the profile of the cam determines the number of detent positions. Another example may include an electric motor mechanically coupled to either shaft 44, 46 to rotate the body 14. A control system may then command the motor to stop and hold the body 14 at predetermined orientations based on user input.

Looking at the utility of the console body 14, the side wall 42 may be provided with a number of features, such as cup holders 60 and coin holders 62. In addition, storage bins 64, both with and without covers, for holding gloves, cellular phones or even notebook computers are also possible. Finally, it may be provided with electrical power ports 66. By, rotating the body to various detent positions, the user can access these features. This ability allows for the provision of more storage features than a conventional console.

In addition, the open center 16 also allows for the provision of specialty compartments 68 on the sides of the console body 14 that may be accessed by the user even when they are not in the top position. For example, a user may store sunglasses in a specialty compartment 68 on the side of the console body 14 while still being able to access cup holders 60 on the top of the console body 14 (see FIG. 1).

Later, the user may rotate the body 14 (see FIG. 2), and move the specialty compartment 68 to the bottom and move features that were formally on top to the side. Hence, each side of the console body 14 may have compartments specially designed to be accessed by the user in only specific orientations of the body 14.

Figure 5:
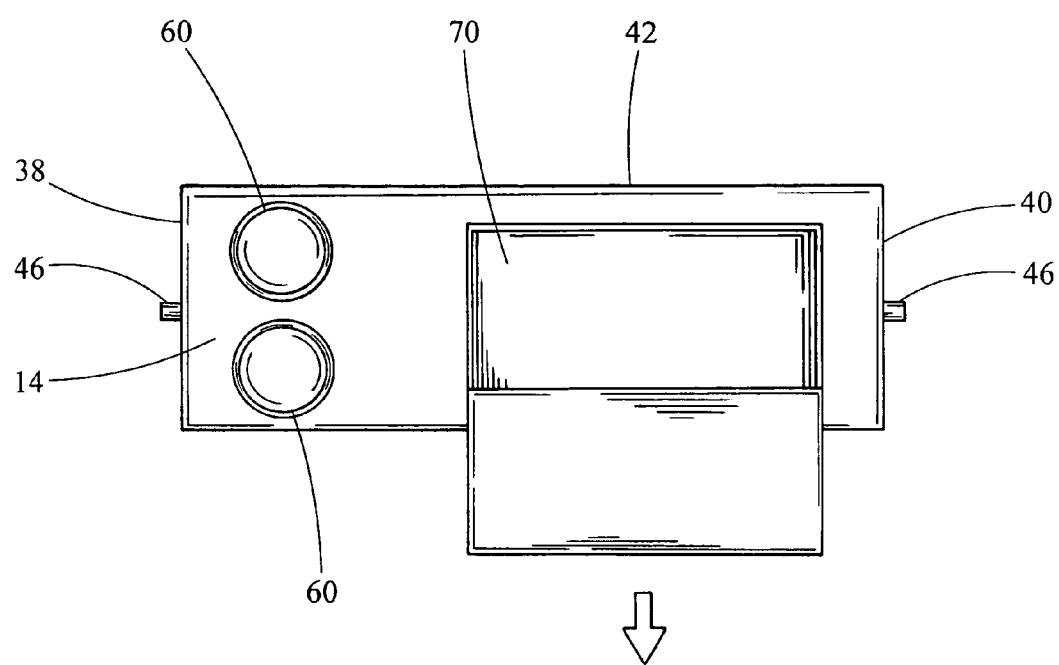
FIG. 5 is a top view of the console body showing an alternate storage configuration.

Finally, the ability to remove the console body 14 from the housing 12 allows a manufacturer to provide console bodies 14 with multiple configurations. As indicated above, some rotating bodies 14 may have cup holders 60, coin holders 62, and a number of small bins 64. However, when a user is attempting to store larger items, small storage bins are less useful. Therefore, a second console body 14 may be provided that omits the small storage bins and substitutes a large compartment 70 (see FIG. 5) to store, for example, a notebook computer. This allows the user to customize the interior of their vehicle depending on the storage needs of a given day.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A center console for a motor vehicle comprising:
   a housing to be stationary mounted within the vehicle, the housing having an open center defined between opposing ends; and
   a console body removeably mounted within the open center of the housing and being rotatable about a longitudinal axis through the console body, the console body having longitudinal side walls and at least two of the side walls being visible within the open center, whereby said console body is rotatable such that alternate ones of the side walls are positionable in an uppermost position with respect to the center console.

2. The center console of claim 1, wherein the frame is located on a floor of the vehicle between at least two seats.

3. The center console of claim 1, wherein the console body includes shafts collinear with the longitudinal axis such that the shafts are in rotating engagement with the opposing ends, the shafts mounting the console body to the frame.

4. The center console of claim 3 wherein the shafts are included on the opposing ends and the console body is in rotating engagement with the shafts.

5. The center console of claim 3, including a latch and actuator, wherein the actuator triggers the latch and releases at least one shaft from engagement with the opposing end, allowing the rotating body to be removed from the open center.

6. The automobile console of claim 5, wherein the actuator comprises a push-button mechanism.

7. The automobile console of claim 5, wherein the actuator comprises a mechanical turn-key lock.

8. The automobile console of claim 5, wherein the actuator comprises a electronic mechanism.

9. The center console of claim 1 further comprising a second console body having a configuration different from the other console body.

10. The center console of claim 1 wherein at least one cupholder is defined in the console body.

11. The center console of claim 1 further comprising a detent mechanism, the detent mechanism selectively positioning the console body in at least first and second and retaining positions.

* * * * *